(12) United States Patent
Nair et al.

(10) Patent No.: US 11,838,566 B2
(45) Date of Patent: Dec. 5, 2023

(54) SYSTEM AND METHOD FOR ALTERNATE PROGRAM EXPERIENCE IN DIGITAL BROADCASTING

(71) Applicant: INNTOT TECHNOLOGIES PRIVATE LIMITED, Kerala (IN)

(72) Inventors: Rajith Raman Pillai Indusekharan Nair, Kerala (IN); Prasanth Padmalayam Thankappan, Kerala (IN); Abdul Sameeh Parangodath, Kerala (IN); Aswin Karayee, Kerala (IN)

(73) Assignee: INNTOT TECHNOLOGIES PRIVATE LIMITED, Kerala (IN)

( * ) Notice: Subject to any disclaimer, the term of this patent is extended or adjusted under 35 U.S.C. 154(b) by 72 days.

(21) Appl. No.: 17/544,140

(22) Filed: Dec. 7, 2021

(65) Prior Publication Data

US 2023/0156252 A1 May 18, 2023

(30) Foreign Application Priority Data

Nov. 17, 2021 (IN) .............................. 202141052954

(51) Int. Cl.
*H04N 21/2362* (2011.01)
*H04N 21/2665* (2011.01)
*H04N 21/2365* (2011.01)
*H04N 21/236* (2011.01)

(52) U.S. Cl.
CPC ... *H04N 21/23614* (2013.01); *H04N 21/2362* (2013.01); *H04N 21/2365* (2013.01); *H04N 21/2665* (2013.01)

(58) Field of Classification Search
CPC ......... H04N 21/23614; H04N 21/2362; H04N 21/2365; H04N 21/2665
USPC ......................................................... 725/116
See application file for complete search history.

(56) References Cited

U.S. PATENT DOCUMENTS

| 9,870,797 B1 * | 1/2018 | Tseytlin ................. G11B 27/28 |
| 10,917,702 B2 * | 2/2021 | Archer, III ......... H04N 21/2668 |
| 2009/0083810 A1 * | 3/2009 | Hattori ............... H04N 21/6405 725/92 |

(Continued)

*Primary Examiner* — Nathan J Flynn
*Assistant Examiner* — Caroline Somera
(74) *Attorney, Agent, or Firm* — MILLEN, WHITE, ZELANO & BRANIGAN, P.C.; William Nixon; Wan-Ching Montfort (57) ABSTRACT

A system and method for alternate program experience in digital broadcasting multiplexes different time duration-based versions of the currently broadcasted program in the same frequency in a broadcast environment. Every program broadcasted in a SES (Special Experience Services) could have different versions (every version is a separate hidden service) of the same program i.e., tiny version, short version, standard version, main/detailed version, wherein the versions differ in the time duration. While parsing the channel information, the Broadcast Media Receiver will comprehend the presence of SES and different hidden services associated with the SES. Depending on the broadcaster business model or/and the user purchased plan, the user will be presented with the option of viewing and selecting the different versions of the program. Upon selection of the version, the receiver switches to the respective hidden service and thereby start playing the respective version of the program.

12 Claims, 5 Drawing Sheets

(56) References Cited

U.S. PATENT DOCUMENTS

| | | | |
|---|---|---|---|
| 2016/0373817 A1* | 12/2016 | Drake | H04N 21/44029 |
| 2018/0139495 A1* | 5/2018 | Eyer | H04N 21/84 |
| 2019/0149864 A1* | 5/2019 | Britt | H04N 21/4788 |
| | | | 725/28 |
| 2020/0037030 A1* | 1/2020 | Isbiliroglu | H04N 21/454 |
| 2021/0167880 A1* | 6/2021 | Hwang | H04H 60/73 |

* cited by examiner

SYSTEM AND METHOD FOR ALTERNATE PROGRAM EXPERIENCE IN DIGITAL BROADCASTING

FIELD OF INVENTION

This invention comes under the field of digital broadcasting, specifically under the field of transmission of alternate programs and reception and presentation of these programs in a broadcast environment.

BACKGROUND OF THE INVENTION

Television and radio remain one of the prime systems of entertainment in the world, despite the rise of the internet. With technological development, the traditional systems like television, radio, etc. are digitized and brought under the umbrella of IoT (Internet of Things), so that these systems can be connected through the world of the internet and various possibilities hitherto unexplored can be ventured upon. The traditional mode of information broadcasting is being phased out in favour of streaming services, different modes of information broadcasting like viewer-focused mode of broadcasting, etc. In an era where the customer is the most precious commodity, different television broadcasters vie for every ounce of the viewer's attention and offer diverse varieties in content, availability timing, etc. catering to different user preferences.

The term broadcasting refers to the distribution of signals through a particular medium, so that the signals can be received by many people at different locations. The signals can be audio or video, a combination of both, depending on the business models of the broadcaster. Radio and Television are typical examples of these transmission models. From one-on-one communications in the form of a telegraph, telephone, signal transmission and distribution evolved to one-to-many distribution or broadcasting, which laid the foundation for modern television and radios. In the beginning, signal transmission was only in analogue, where one signal form took over the entire bandwidth. With the evolution in the digitization of signals, several signals could be compressed using digital techniques and transmitted over a single bandwidth.

There are three main analogue television/video standards in use throughout the world:

NTSC: (National Television System Committee) used in the USA, Canada, Japan and some other countries PAL: (Phase Alternating Line) used in most of western Europe, Australasia and South Africa SECAM: (système électronique couleur avec mémoire, French for Electronic system colour with memory) used in France, Africa and eastern Europe.

The three systems are not compatible with each other. All the countries using SECAM are currently in the process of conversion, or have already converted to Digital Video Broadcasting (DVB), those using NTSC are currently transitioning to the ATSC (Advanced Television Systems Committee) standard, or to DVB, ISDB (Integrated Services Digital Broadcasting) or DTMB (Digital Terrestrial Multimedia Broadcast), while those using PAL are transitioning to DVB, ISDB or DTMB. These are the different digital broadcasting standards followed by various countries throughout the world. In Digital broadcasting, the channels are transmitted over fibre or optic cables, over the air (terrestrial), and satellites etc. Communications satellites are used to send television signals directly to the homes of viewers—a form of transmission called direct broadcast satellite (DBS) television.

Hence a single bandwidth can now carry multiple channels, laying the foundation for modern broadcasting. With multiplexing, which involves interleaving several lossless compressed signals using a carrier signal, further development was brought about resulting in an explosion of progress leading to innumerable channel and program choices and competition in the broadcasting scene.

Signals are multiplexed using CDM (Code Division Multiplexing) or other multiplexing technologies, depending on the standards followed by the broadcasters. Multiplexing involves the consolidation of several network signals into a single complex signal and transmission over coaxial cables, fibre cables, satellites, etc. On reaching the appropriate destination, the demultiplexers separates the signals and outputs them to individual lines.

In telecommunications, a carrier wave/carrier signal is a waveform that is modulated (modified) with the signal to be transmitted, for the purpose of conveying information. The modification can be made on the frequency or the wavelength of the carrier wave.

In analog transmission, signals are multiplexed using frequency-division multiplexing (FDM), in which different signals are combined/multiplexed for transmission on a single channel carrier signal by varying/dividing the carrier signal frequencies according to the signals to be transmitted and assigning a frequency for a particular channel. In digital transmission, signals are usually multiplexed using time-division multiplexing (TDM), in which the multiple signals are carried over the same channel in alternating time slots. In some optical fiber networks, multiple signals are transmitted together as separate wavelengths of light using dense wavelength division multiplexing (DWDM) or WDM (Wavelength Division Multiplexing). Orthogonal frequency-division multiplexing (OFDM) is a method of digital transmission by encoding the digital information on multiple carrier frequencies. OFDM is now popularly used for wideband digital communication, for example, in digital television and audio broadcasting, internet, wireless networks, 4G/5G mobile communications, etc.

In television broadcasting, a multiplex (mux/virtual sub-channel/bouquet) is a grouping of program services as interleaved data packets that can be broadcast over a network or a modulated multiplexed medium. The program services are split out at the receiving end, depending on the multiplexing techniques and standards followed by that particular country and the broadcasters.

Television and Radio audience are different categories due to their interest in the program, time availability etc. Usually, the audience is diverse in nature. While one set of audience wants to watch a program in detail due to their taste and time availability, another set of audience may want to watch only the critical summary of the program. Further, there could be dynamic variations in the interest of the same person. For example, after viewing the tiny version (critical summary) of a program, he/she could get interested in viewing the detailed version of the program.

Current broadcasting technology does not cater to such diverse nature of audience and only one version of the program gets broadcasted and the audience have no other choice to watch it in full or to fast forward through the entire program to get the gist of the program, which is a tedious way of watching any program.

A few patents on innovation in the field of broadcasting are discussed below:

The patent US20160365120A1: Video editing system for generating multiple final cut clips, discusses about a video editing apparatus and method for generating multiple final cut clips. In one embodiment, a video editing system comprises editing processing logic controllable to perform, on one or more raw input feeds, a plurality of different edits to render one or more final cut clips for viewing, where each of the one or more edits transforms data from one or more of the raw input feeds into the one or more of the plurality of final cut clips by generating tags that identify highlights from signals, and generating one or more variations of the final cut clips as a result of independent control and application of the editing processing logic to data from the one or more raw input feeds. This idea related to video editing apparatus which is used for multiple versions of a single recorded data based on the external meta data and/or preferences. This idea is different from the present invention's core idea of multiplexing different time duration-based versions of the currently broadcasted program in a broadcast environment.

In the patent U.S. Pat. No. 10,560,746B2: Methods and systems for generating and providing program guides and content, Systems and methods for identifying, assembling, and publishing content are described. A content item, such as a video, having a first-time length, is identified by a system to be included in a program scheduled for a first time period. The video may be hosted on a third-party system. A first span of time within the first program is allocated for the video, wherein the first span of time is longer than the first-time length. The system determines, prior to or at the first time period, a time difference between a current length of the video and the first span of time. At least partly in response to determining that the video has a time length shorter than the first span of time, the system selects supplemental content based at least in part of the determined time difference to be streamed to user terminals over a data network within the first time period. This patent describes a system and method for selection and presentation of a replacement program when a program scheduled to be presented is no longer accessible from a third-party content server. In this patent the different versions of content are sent one after another. This idea is different from the present invention's core idea of multiplexing different versions(duration) of the currently broadcasting program in a broadcast environment.

Our present invention offers a system or method for a better way of captivating the attention and interest of the audience by offering a plurality of versions of the same program with varying duration, rather than just a single version of the same program. This could be made available to the user on a premium basis or to everyone depending on the business model of the broadcaster. Such broadcast services are called Special Experience Services (SES).

OBJECTIVE OF THE INVENTION

The main objective of our invention is to provide a system and method to provide an alternate viewing experience in digital broadcasting by offering versions of different durations of the same program, in accordance with the audience/user preference. The secondary objective of our system is to multiplex different versions of the same program so that the receiver can decode them and present the options to the user on demand or as services, depending on the business model of the broadcaster.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing and the claims and the abstract, as a whole.

The major problem addressed by the invention is towards the development of a system or and a method for providing an alternate experience, different from the current ones as experienced by the consumer of the broadcasted programs. Our invention provides the option of viewing the same program, but with different durations: they can either be a summary, or a critical scenes view, standard view or the detailed version, depending on the user's preference at that time. Thus, our system presents a different method of presenting variants of the same program to the user, based on their current preference.

The program viewing decision of the audience depends on their taste and time availability. Instead of holding the viewers in captive to watch the program in full length or fast forwarding through the program and provide a quality experience for the audience, our present invention multiplexes different length versions of the same program and provides the viewer the option of viewing summaries/critical scenes/standard or the detailed version of the same program as a special services that the broadcaster can provide as a premium subscription or as a view-on-demand, depending on their business model. Such broadcast services are called Special Experience Services (SES).

In one embodiment, every program broadcasted in a SES could have different versions as listed below:
  Tiny version
  Short version
  Standard version
  Main/detailed version Each of these versions are created based on the time duration. Default program transmission will be the main/detailed version. Different versions of the same program are sent as different services within the same frequency. However, all special services are not visible to the user for selection. Associated with each SES, there are hidden services and each of these hidden services are transmitting different versions of the same program.

The Digital Broadcast Media Receiver (Television supporting standards like the ATSC, DVB, ISDB, DTMB or Radio supporting standards such as DRM, DAB, CDR, ISDB-Tsb etc.) upon receiving the channel information of a particular frequency parses the channel information data and builds service list. While parsing the channel information, the Broadcast Media Receiver will understand the presence of SES and the different hidden services associated with the SES. If the user is premium or if the alternate experience of SES program is available to all, user will be presented with the option of viewing different versions of the program. Depending on the user selection of the version, receiver switches to the respective hidden service.

BRIEF DESCRIPTION OF THE DRAWINGS

The manner in which the proposed system works is given a more particular description below, briefly summarized above, may be had by reference to the components, some of which is illustrated in the appended drawing. It is to be noted; however, that the appended drawing illustrates only typical embodiments of this system and are therefore should not be considered limiting of its scope, for the system may admit to other equally effective embodiments.

Throughout the drawings, the same drawing reference numerals will be understood to refer to the same elements and features.

The features and advantages of the present proposed system will become more apparent from the following detailed description a long with the accompanying figures, which forms a part of this application and in which.

REFERENCE NUMERALS

100 Channel Information
101 Service Information
102 Special Service
103 Main/Visible Service
104 Hidden Service 1
105 Hidden Service 2
106 Hidden Service 3
107 Main Version
108 Tiny Version
109 Short Version
110 Standard Version
200 Receiver in tuned state
201 Check presence of SES in channel information
202 If the condition 201 is not fulfilled
203 If the condition 201 is fulfilled
204 Parse Service information for getting SES details
205 SES Program version information is presented to User
206 User selects any SES program version
207 If the condition 206 is not fulfilled
208 If the condition 206 is fulfilled
209 Selected SES program version is played
300 Main/Detailed Version
301 Tiny 1
302 Tiny 2
303 Tiny 3
304 Tiny 4
305 Tiny 5
306 Tiny 6
307 Tiny 7
308 Tiny 8
309 Short 1
310 Short 2
311 Short 3
312 Short 4
313 Short 5
314 Short 6
315 Standard 1
316 Standard 2
317 Standard 3
318 Standard 4
319 TS time axis
320 T1 time axis
321 TE time axis
322 Time axis
400 Channel Information
401 Service Information
402 Main Content Generator
403 SES Content Generator
404 Content Multiplexer
405 Digital Media Signal Generator
406 Transmitter Antenna
500 Receiver Antenna
501 Signal Demodulator
502 Content Demultiplexer
503 Channel Information
504 Service Information
505 Main Version
506 Tiny Version
507 Short Version
508 Standard Version

DETAILED DESCRIPTION OF THE INVENTION

The principles of operation, design configurations and evaluation values in these non-limiting examples can be varied and are merely cited to illustrate at least one embodiment of the invention, without limiting the scope thereof.

The embodiments disclosed herein can be expressed in different forms and should not be considered as limited to the listed embodiments in the disclosed invention. The various embodiments outlined in the subsequent sections are construed such that it provides a complete and a thorough understanding of the disclosed invention, by clearly describing the scope of the invention, for those skilled in the art.

In broadcasting, the diverse nature of audience is considered and only one version of the program gets broadcasted and the audience are held captive to watch the way the program is broadcasted.

Hence, it may be better for the broadcaster to send plurality of versions of the same program to cater to different audience types rather than holding them captive. This could be made available to the user on a premium basis or to everyone as on-demand/a-la-carte, depending on the business model of the broadcaster. Such broadcast services are called Special Experience Services (SES).

In one embodiment, every program broadcasted in a SES could have different versions as listed below.

Tiny version
short version
standard version
main/detailed version

Each of these versions are derived based on the time duration. Default program transmission will be the main/detailed version. Different versions of the same program are sent as different services within the same frequency. However, not all special services are visible to the user for selection. Associated with each SES, there are hidden services and each of these hidden services are transmitting different versions of the same program. So now, the user will be presented with the option of viewing different versions of the program. Depending on the user selection of the version, the receiver switches to the respective hidden service.

Figure 1:
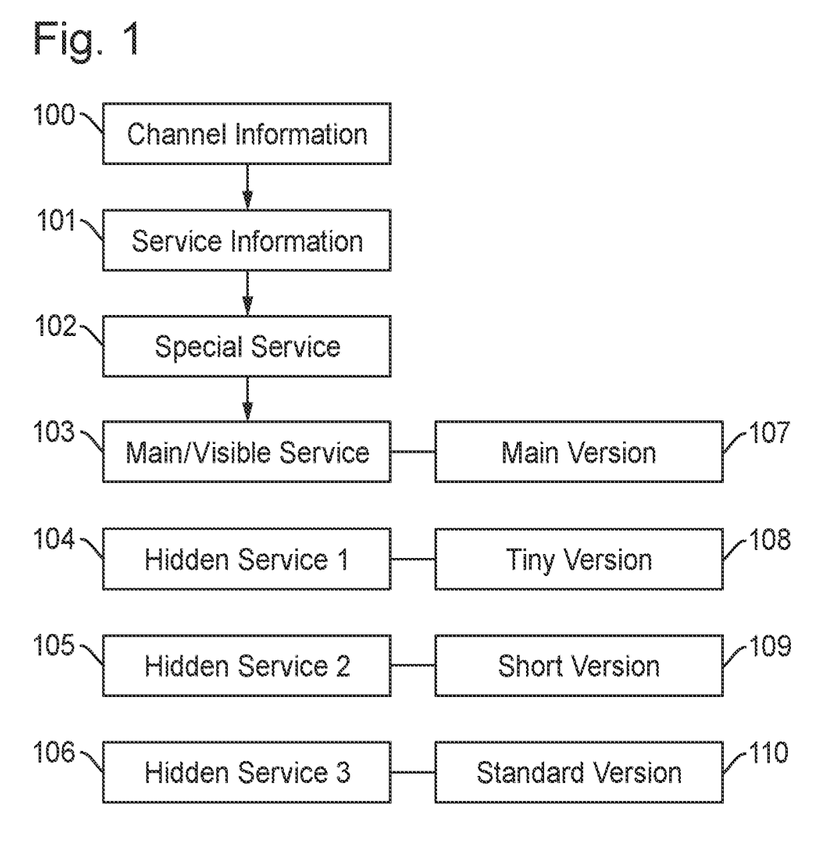
FIG. 1: Block Diagram describing the Special Experience Services and associated Hidden Services in Digital Broadcasting features of our system in accordance with our present invention.

The Special Experience Services and associated Hidden Services in Digital Broadcasting features of the present invention is illustrated in FIG. 1. The Channel Information (100) contains the Service information (101), which contains details about the special service (102). The special service, in this embodiment consists of: the main/visible service (103), which is the Main Version (107), the hidden service 1 (104) which is the tiny version (108), the hidden service 2 (105) which is the short version(109), and the hidden service 3 (106) which is the standard version(110).

Figure 2:
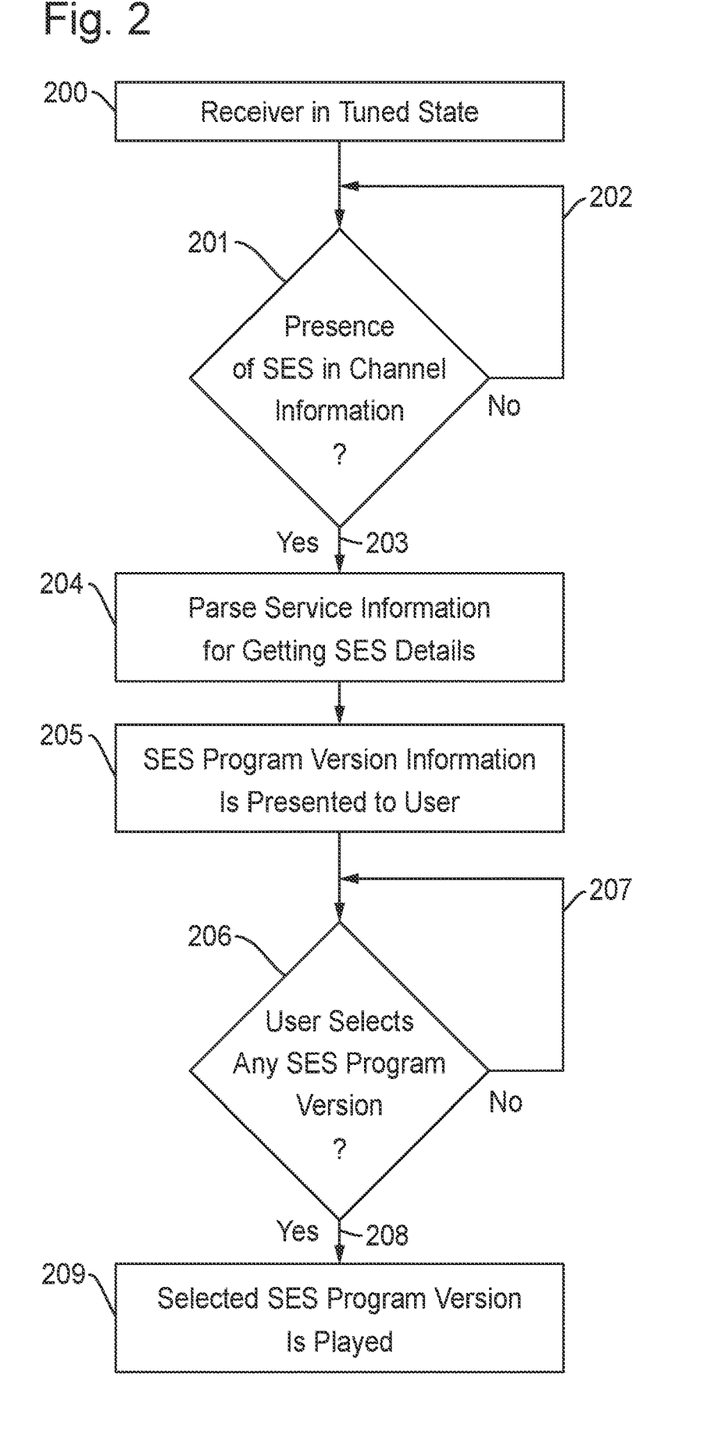
FIG. 2: Flow Chart indicating the SES presentation in our system in accordance with our present invention.

FIG. 2 represents the SES presentation in flowchart form. The Receiver in the tuned state (200) checks for the presence of SES in the channel information (201). If there is no SES (202), it keeps a lookout for other incoming signals for SES. On presence of SES (203), the receiver parses Service information (204) for getting SES details and presents it to the user (205). When the user selects any version of the program (206), then the condition is fulfilled (208) and the selected SES version is played (209). If the condition is not fulfilled, then the receiver returns to wait for a selection (207).

While playing a version, user will have an option to switch to other versions or go to live. If the user selects a version, it will be played by switching to the corresponding hidden service.

Shorter versions of the program could be broadcasted again in a cyclic fashion in their respective hidden services once the shorter version of program broadcast is completed entirely. Such cyclic broadcasting of shorter versions of the program could be repeated till the end of the original version of the program in the main/visible service.

In another embodiment of our present invention, for a user switching on the Television or Radio receiver after the program has started, he/she could still switch to the hidden service during the beginning of next cycle of shorter version transmission. In order to enable user selection, availability of shorter versions (from the beginning) will be indicated to the user through an appropriate User Interface.

In another embodiment, of our present invention, the user will be able to switch to shorter versions even though the live transmission position of the selected version may not be in the start parallelly along with that particular selected version.

Figure 3:
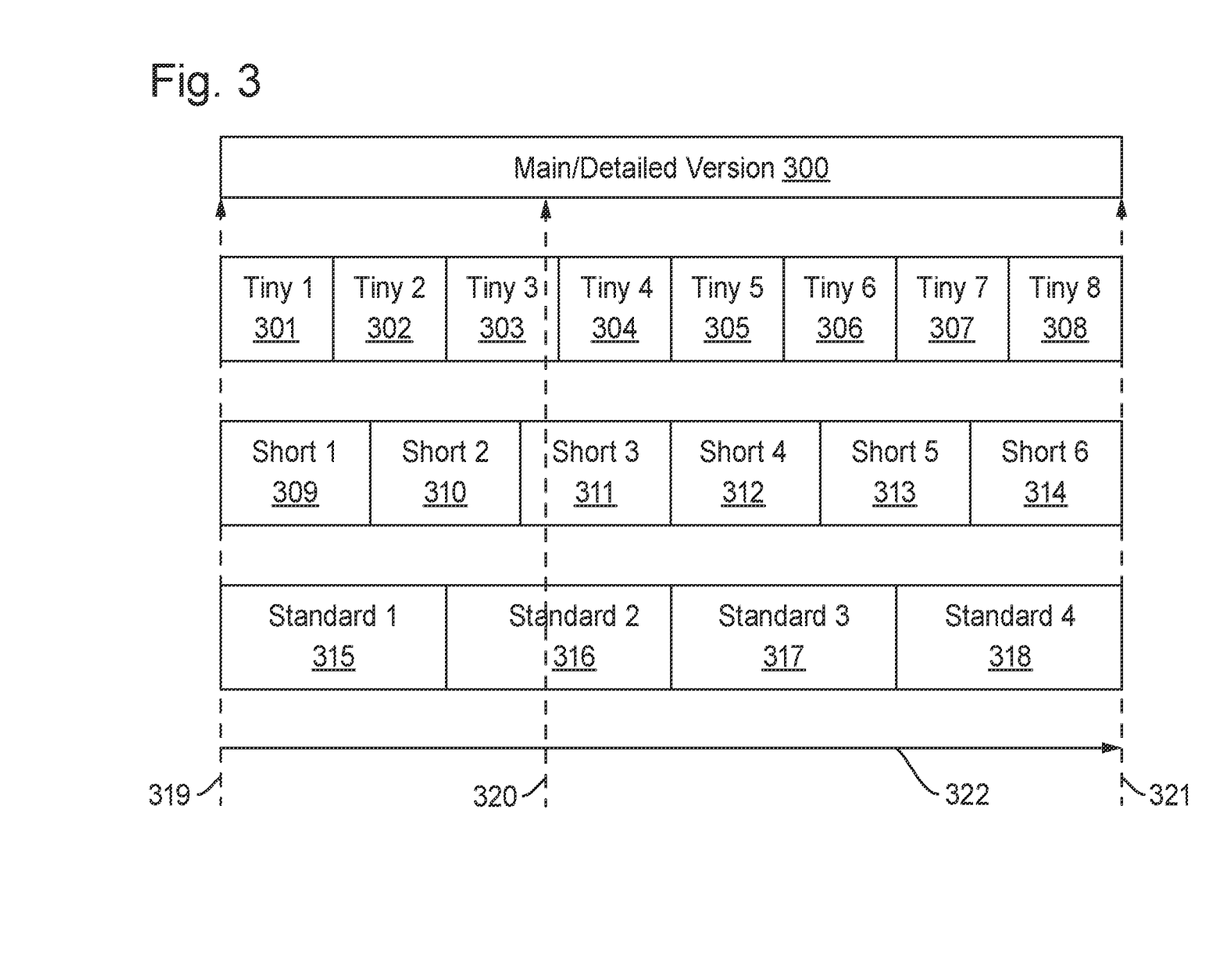
FIG. 3: Block Diagram representing the repeat broadcasting of the shorter versions vis-à-vis duration of the program in our system in accordance with our present invention.

FIG. 3 Represents the repeat broadcasting of the shorter versions vis-à-vis duration of the program. Where, (319) is the start time, (321) is the end time and (320) is an intermediate time.

If the user starts watching at (319), all the versions are available from the beginning. If the user starts to watch the program at (320), user will miss out some part of the main version (300). Since the tiny (301, 302, 303, 304, 305, 306, 307, 308), short (309, 310, 311, 312, 313, 314) and standard (315, 316, 317, 318) versions are cyclic, user can switch to these versions as soon as their next broadcast transmission cycle starts. When the next broadcast transmission cycle a program version is about to start, user will be presented with the option to switch to the particular version/s.

Figure 4:
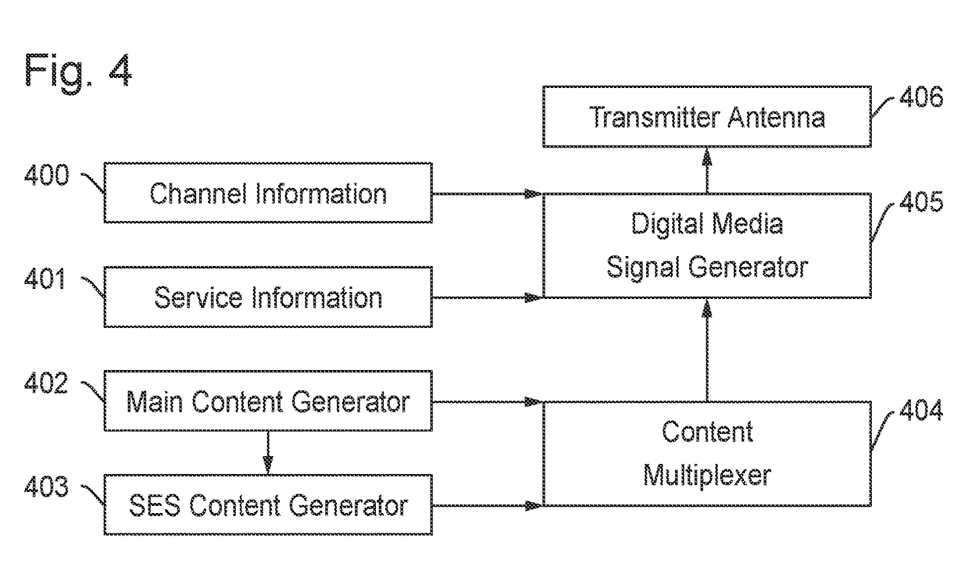
FIG. 4: Block Diagram describing the components and the workflow of our system in accordance with our present invention

FIG. 4 represents the digital media broadcaster system. SES (Special Experience Services) are generated from main content. Main content (402) and SES content (403) are multiplexed by content multiplexer (404). Multiplexed contents, Channel information (400) and service information (401) are converted as digital media signals by the digital media signal generator (405) and transmitted through the transmitter antenna (406). The digital media signal generator will follow any of the digital media standards.

Figure 5:
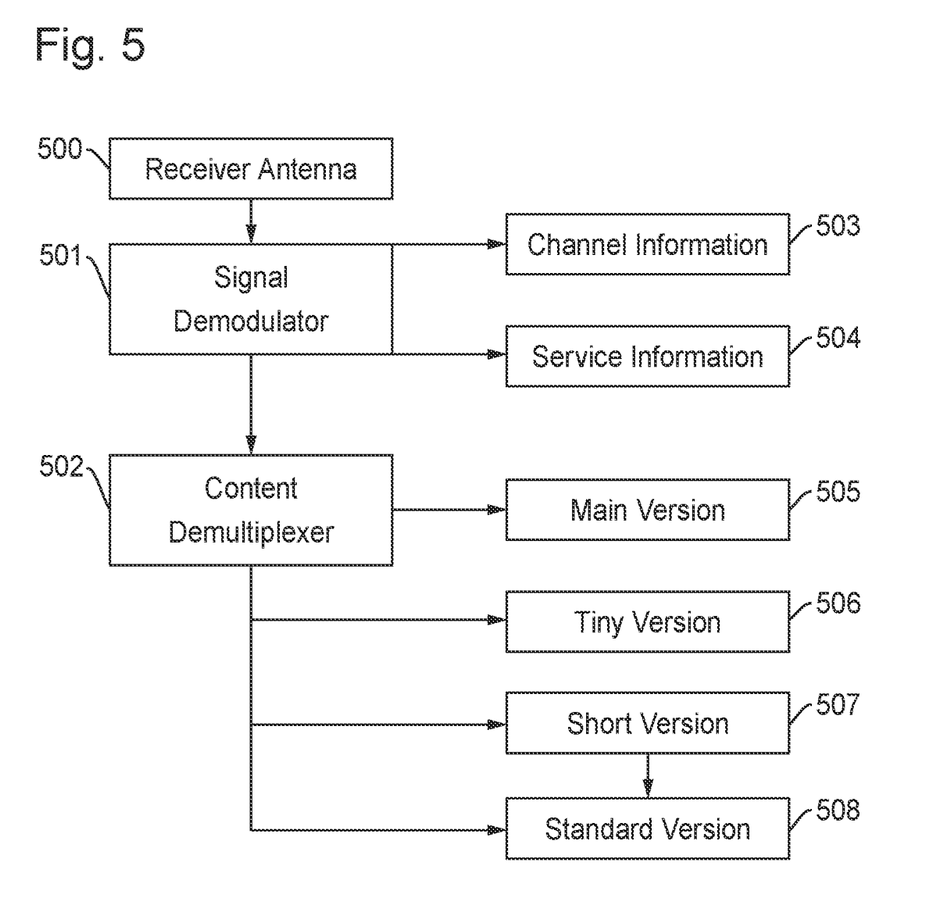
FIG. 5: Block Diagram describing the components and the workflow of our system in accordance with our present invention.

FIG. 5 represents the digital media receiver system. The receiving antenna (500) will receive the RF signal. Signal Demodulator (501) will demodulate and channel decode the RF signal. Output of the Signal Demodulator will be channel information (503), service information (504) and multiplexed media content. Thus, the multiplexed media content is demultiplexed to different versions (505, 506, 507, 508) by the content demultiplexer (502).

The advantages of the present-day embodiment of our system are: Users can access any version of the same program, without having to skip or fast forward or other actions; Thus, the user can enjoy any program in the time duration that the user specifies and not the program. This benefits the broadcaster and the show producers as this means instead of producing different shows with varied duration, the same program can be viewed in different duration formats, thus reaching a wider audience and less pressure to make different time duration—based content catering to different audiences. When the special services are made available either as a premium or on-demand, then that creates additional revenue for the broadcaster.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention, should therefore not be limited by the above-described embodiment, method, and examples, but by all embodiments and methods within the scope of the invention as claimed.

We claim:

1. A system for alternate program experience in digital broadcasting by multiplexing different time duration-based versions of the currently broadcasted program in a broadcast environment, the system comprising:
   a digital media broadcaster system that includes a main content generator to generate main content data and a special experience services generator to generate special experience services content data, which are multiplexed together in a signal, wherein the special experience services content data include special experience versions of the main content based on different time durations, wherein the main content data and the special experience services content data are sent as different services within a same frequency, and wherein the special experience services are associated with hidden services and each of these hidden services is transmitting a different version of the main content data; and
   a digital media receiver system that demultiplexes the special experience services content data and the main content data from the signal and presents the same for user consumption and switches between the main content data and at least one of the special experience services content data during broadcast, wherein the digital media receiver system checks for a presence of a special experience service in the main content data, and if the special experience service is present, the digital media receiver system parses service information for getting a special experience version corresponding to the presented special experience service and presents it to the user.

2. The system for alternate program experience in digital broadcasting as claimed in claim 1, wherein the digital media broadcaster includes
   a content multiplexer that multiplexes the main content data;
   the special experience services content data as a single complex signal that passes through a digital media signal generator that adds channel information; and
   service information to the multiplexed signal that is sent through the transmitter antenna.

3. The system for alternate program experience in digital broadcasting as claimed in claim 2, wherein the digital media receiver system contains a signal demodulator that demodulates the received modulated signal and obtains the channel information.

4. The system for alternate program experience in digital broadcasting as claimed in claim 1, wherein the multiplexed signal is passed through a content demultiplexer which produces the demultiplexed main content data and the special experience services content data which includes a first version having a first duration, a second version having a second duration that is longer than the first duration, and a third version having a third duration that is longer than the second duration of the main content data.

5. The system for alternate program experience in digital broadcasting as claimed in claim 1, wherein the special experience services content data includes a first version, a second version, and a third version of a same program, where the versions differ in terms of time duration, where the different versions of the same program are sent as different services within a same frequency.

6. The system for alternate program experience in digital broadcasting as claimed in claim 1, wherein the special experience services content data is provided as hidden services as a premium package or as a la-carte/on-demand.

7. A system for alternate program experience in digital broadcasting comprises:
a digital media broadcaster including a content multiplexer that multiplexes a main content data and special experience services content data generated as a single multiplexed signal that passes through a digital media signal generator, the digital media signal generator adding channel information and service information to the multiplexed signal that is sent through a transmitter antenna, wherein the special experience services content data include special experience versions of the main content based on different time durations, where the main content data and the special experience services content data are sent as different services within a same frequency, and wherein the special experience services are associated with hidden services and each of these hidden services is to transmit different versions of the main content data;
digital media receiver system including a signal demodulator that demodulates the received modulated signal and obtains the channel information, the service information, and multiplexed media content where the multiplexed media content is passed through a content demultiplexer, the content demultiplexer producing a demultiplexed main content version and special experience services versions within the special experience services content data, wherein the digital media receiver system checks for a presence of a special experience service in the channel information, and if the special experience service is present, the digital media receiver system parses service information for getting a special experience version corresponding to the presented special experience service and presents it to the user, the special experience services versions include a first version having a first duration, a second version having a second duration that is longer than the first duration, and a third version having a third duration that is longer than the second duration, wherein the digital media receiver system switches between the main content data and at least one of the special experience services content data during broadcast.

8. The system for alternate program experience in digital broadcasting as claimed in claim 7, wherein the special experiences services content including the different versions are of a same program that are sent as different services within a same frequency.

9. The system for alternate program experience in digital broadcasting as claimed in claim 7, wherein the special experience services content are provided as hidden services as a premium package or as a la-carte/on-demand.

10. A method for providing an alternate program experience in digital broadcasting, the method comprising:
multiplexing main content and special experience services content using a content multiplexer of a digital media broadcaster;
adding channel information and service information to a single multiplexed signal having special experience services content and the main content while passing through a digital media signal generator to generate a modulated signal, wherein the special experience services content include special experience versions of the main content based on different time durations, wherein the main content and the special experience services content are sent as different services within a same frequency, and wherein the special experience services are associated with hidden services and each of these hidden services is to transmit different versions of the main content data;
sending the modulated signal through a transmitter antenna connected to the digital media signal generator;
demodulating the modulated signal using a signal demodulator of digital media receiver system to obtain the channel information and the service information and multiplexed media content,
passing the multiplexed media content signal through a content demultiplexer;
producing the main content and the special experience services content, wherein the special experience content includes special experience versions of the main content; and
switching between the main content data and at least one of the special experiences services content data during broadcast,
wherein the method further comprises checking if a special experience service is presented in the channel information, and getting a special experience version corresponding to the presented special experience service if the special experience service is presented, and presenting the special experience version to the user.

11. The method of claim 10, wherein the special experience versions include a first version having a first duration, a second version having a second duration longer than the first duration, and a third version having a third duration longer than the second duration.

12. The method of claim 11, further comprising broadcasting at least one of the first version, the second version, and the third version of the special experience versions repeatedly during broadcast of the main content.

* * * * *